United States Patent [19]

Kasten

[11] Patent Number: 4,677,542
[45] Date of Patent: Jun. 30, 1987

[54] SELF-TUNING REGULATOR IMPLEMENT CONTROL

[75] Inventor: Robert E. Kasten, Moline, Ill.

[73] Assignee: Deere & Company, Moline, Ill.

[21] Appl. No.: 873,858

[22] Filed: Jun. 11, 1986

Related U.S. Application Data

[63] Continuation of Ser. No. 578,902, Feb. 10, 1984, abandoned.

[51] Int. Cl.$^4$ .................... A01B 63/112; G05B 13/04
[52] U.S. Cl. .................................. 364/150; 364/157; 364/159; 364/572; 172/9
[58] Field of Search ............... 364/571, 572, 576, 424, 364/150, 157–159; 172/2–4, 7–12; 37/DIG. 1; 414/699, 700, 701; 340/680, 684, 685; 318/632

[56] References Cited

U.S. PATENT DOCUMENTS

| | | | |
|---|---|---|---|
| 3,109,970 | 11/1963 | Smyth | 364/159 |
| 3,287,615 | 11/1966 | Smyth | 364/157 |
| 4,006,346 | 2/1977 | Pemberton | 364/159 |
| 4,071,821 | 1/1978 | Harthill et al. | 364/572 |
| 4,214,300 | 7/1980 | Barlow et al. | 364/157 |
| 4,495,977 | 1/1985 | Strunk et al. | 364/150 |
| 4,518,044 | 5/1985 | Wiegardt et al. | 172/9 |

OTHER PUBLICATIONS

"System-Identification of Self-Adaptive Control" by W. D. T. Davies, Wiley-Interscience, 1970, London, pp. 35–43.

*Primary Examiner*—Parshotam S. Lall

[57] ABSTRACT

A hitch control system generates a rockshaft valve control signal as a function of sensed draft force, rockshaft position and operator input. Periodically, an auxiliary or disturbance signal of certain amplitude, frequency and duration is superimposed on the valve command signal. A calculated soil/implement gain is derived from components of the valve command signal and the measured draft force which have certain phase relationships with the disturbance signal. An electronic gain is modified so that the overall soil/implement gain remains substantially constant.

15 Claims, 8 Drawing Figures

SELF-TUNING REGULATOR IMPLEMENT CONTROL

This application is a continuation of application Ser. No. 578,902, filed Feb. 10, 1984, now abandoned.

BACKGROUND OF THE INVENTION

This invention relates to a control system for controlling the working depth of an implement pulled by an agricultural vehicle.

The quality of operation of conventional hitch control systems, such as draft and/or position-responsive systems, may vary, depending upon the particular implement being used or upon the particular soil conditions encountered. For example, a particular control system with a fixed gain may operate sluggishly under relatively loose soil conditions, whereas, the same control system may cause undesirably rapid, violent or unstable hitch and implement motions when working in relatively stiff soil conditions. One solution would be to provide a variable gain control which can be adjusted by the vehicle operator to optimize performance under various conditions. However, it would be desirable to provide hitch or implement control systems which automatically compensates for varying conditions without increasing the level of skill or effort required of the operator. One such automatically compensating system is described in a "Model Reference Adaptive Control System" in U.S. Application, Ser. No. 405,835, (now U.S. Pat. No. 4,495,577) filed Aug. 6, 1982 and assigned to the assignee of the present invention. This "Model Reference Adaptive" control system requires an operator-adjustable draft setting or load command knob in addition to a position command lever. It would be desirable to provide an automatically compensating implement control system which is simpler with respect to the number of operator controls required and with respect to algorithm complexity.

SUMMARY OF THE INVENTION

An object of the present invention is to provide an implement control system which automatically compensates for variations in soil conditions and/or implement characteristics.

Another object of the present invention is to provide a self-tuning regulator control system to automatically adjust the controller gain to compensate for different implements and soil conditions.

Another object of the present invention is to provide an implement control system which measures a time varying component of a soil/implement "gain" and which uses this measurement to compensate an electronic gain and thereby maintain a constant system response.

These and other objects are achieved by the present invention which includes means for generating a rockshaft valve control signal as a function of sensed draft force, rockshaft position and operator inputs. Periodically, an auxiliary or disturbance signal of certain amplitude, frequency and duration is superimposed on the valve command signal. A calculated soil/implement gain is derived from components of the valve command signal and the measured draft force which have certain phase relationships with the disturbance signal. These components are derived by a technique which is analogous to a standard Fourier analysis technique. An electronic gain is modified so that the overall soil/implement gain remains substantially constant.

DETAILED DESCRIPTION

An agricultural tractor 10 includes a conventional hitch 12, such as a three-point hitch, for coupling to a conventional ground-engaging implement 14, such as an integrally-mounted chisel plow. Draft forces generated by the plow-ground interaction are sensed by conventional draft sensors 16, such as strain gages, variable transformer draft sensors, such as described in U.S. Application, Ser. No. 332,577, (now U.S. Pat. No. 4,422,341) filed Dec. 21, 1981, or the equivalent. For example, five draft sensors could be used, one inserted in the center link 18 and two inserted in each of the draft links 20, one of which is visible in FIG. 1. The draft sensors 16 generate three separate signals having scalar values $A(2)$ through $A(6)$. The hitch 12 includes a conventional rockshaft 22 which is rotated by one or more connected hydraulic cylinders 24 to raise and lower the hitch 12 and implement 14. The cylinders 24 may be controlled by a known electrically-operated control valve 26, such as a Moog series 72 servo valve. A potentiometer-type sensor 28 senses the position of the rockshaft 22 and generates a signal $A(1)$ which represents the position of the rockshaft 22 and thereby represents the position of the implement 14. A two-position switch 30 generates a two-level raise and lower signal $A(7)$ which is used to raise and lower the implement at headlands in response to raise/lower lever or control device 32. A potentiometer 34 generates a position or depth command signal $A(9)$ as a function of position control knob 36. The operator-controlled devices 32 and 34 may be positioned at any convenient location in the operator's compartment of the tractor.

Figure 1:
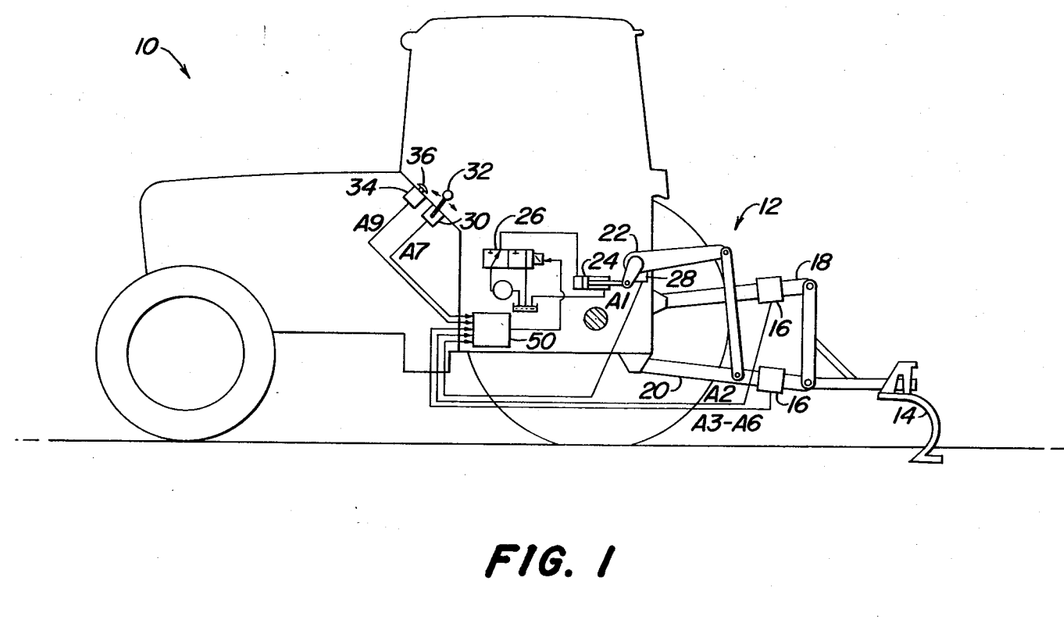
FIG. 1 is a schematic drawing of an agricultural vehicle, hitch and implement suitable for use with the present invention.

The signals from the sensors 16, 28 and 34 and from switch 30 are communicated to an electronic control unit 50 which generates valve control signals which are communicated to the control valve 26. The control unit 50 could include a conventional analog-to-digital converter (not shown) for converting the signals from sensors 16, 28 and 34 to digital representations thereof, a conventional microprocessor (not shown) and a conventional digital-to-analog converter and power amplifier (not shown) for converting the digital control signal, HVCO, from the microprocessor to an analog voltage or current which is then applied to the control valve 26. The control signal, HVCO, is generated as a function of the sensed inputs according to an operational program or algorithm.

This control algorithm will now be described with reference to the flow charts shown in FIGS. 2a-2e and with reference to the source language (Fortran) computer program listing at the end of this description. The parenthetical numbers within this description correspond to the line or statement numbers of the portions of the program listing.

Figure 2A:
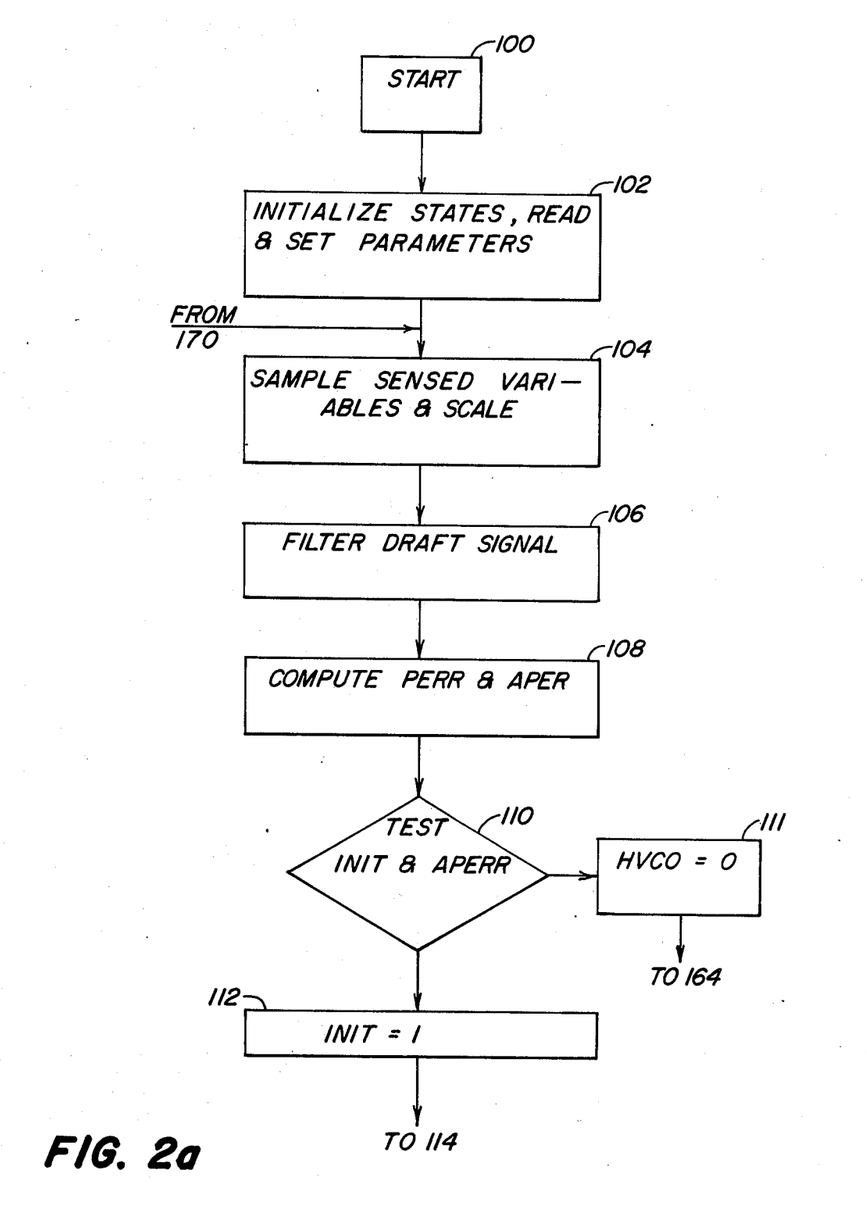
FIGS. 2a-f are simplified flow charts of the algorithm performed by the central control unit of the present invention.
Figure 2B:
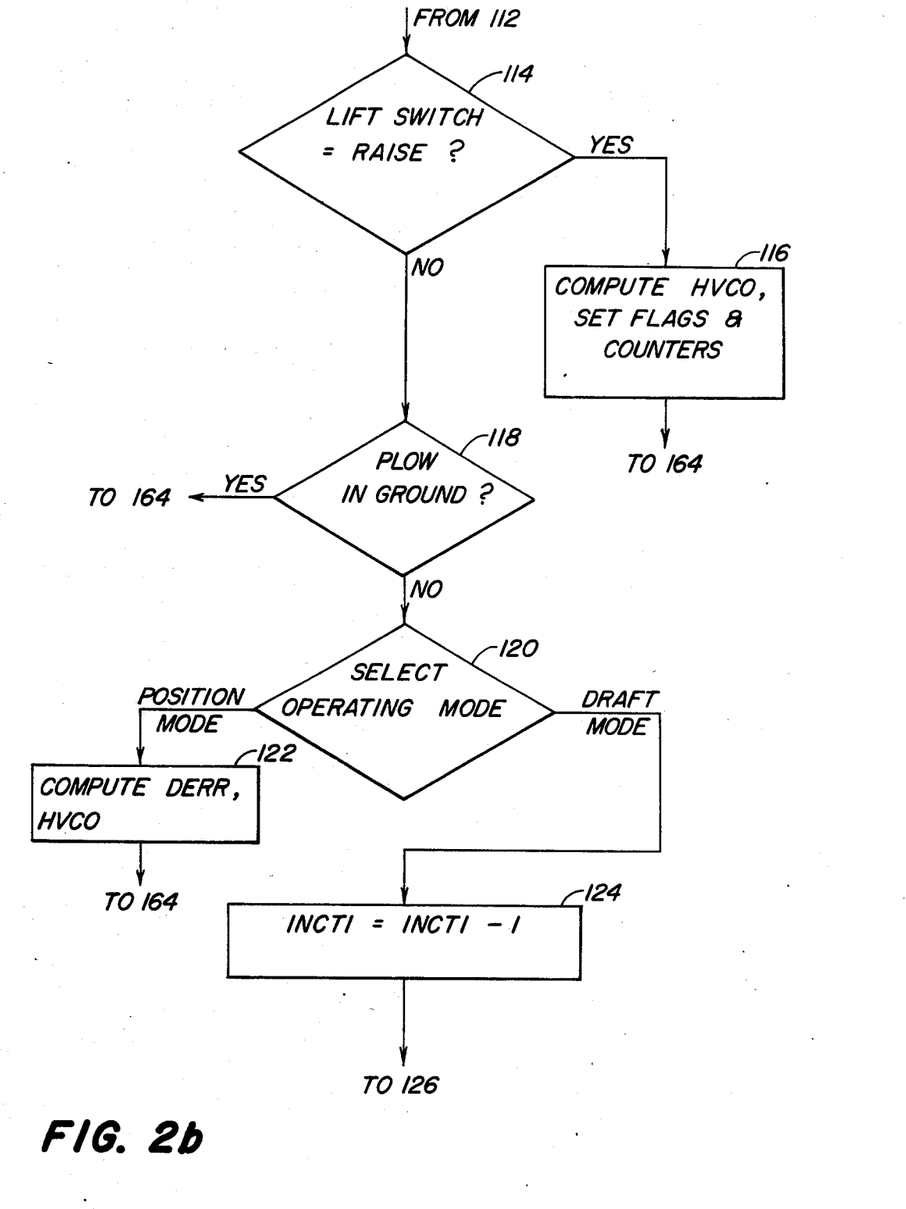
Figure 2C:
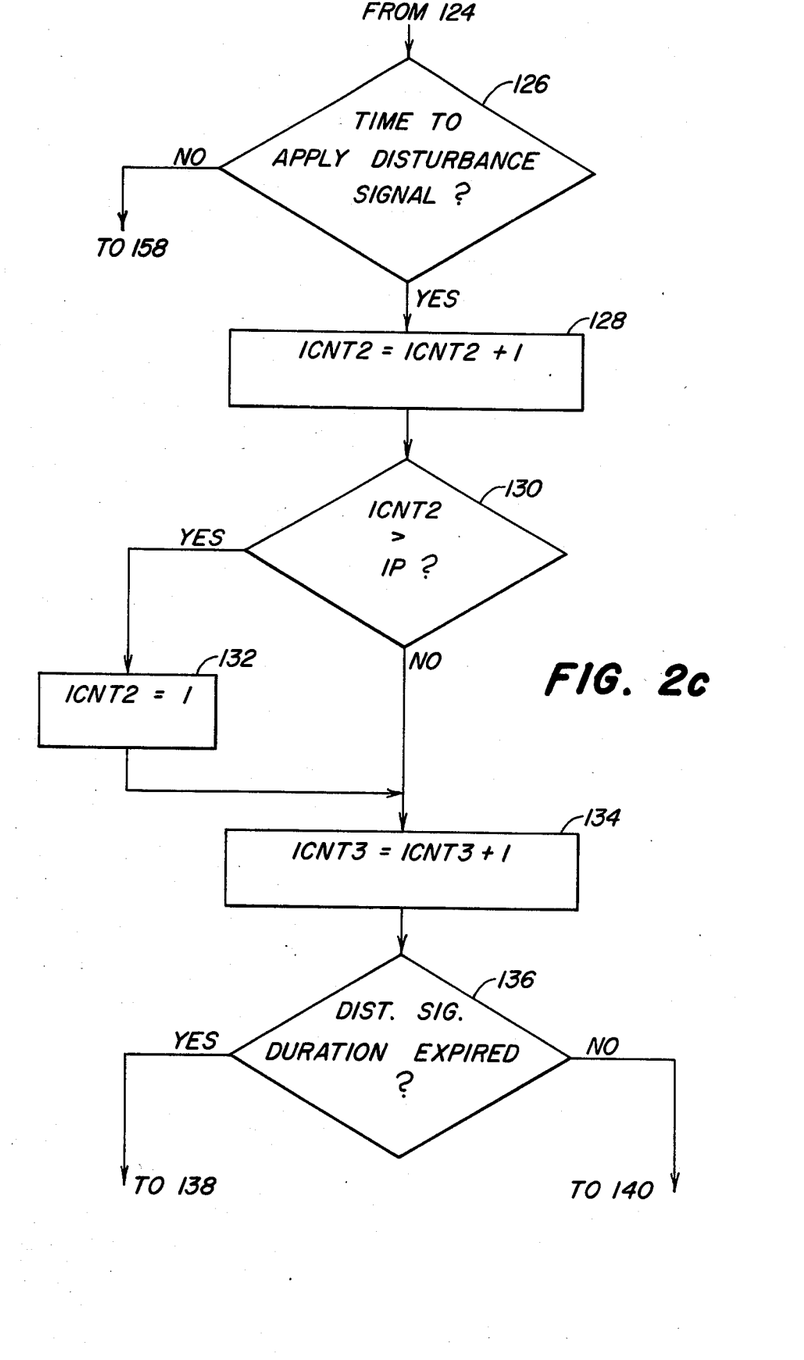
Figure 2D:
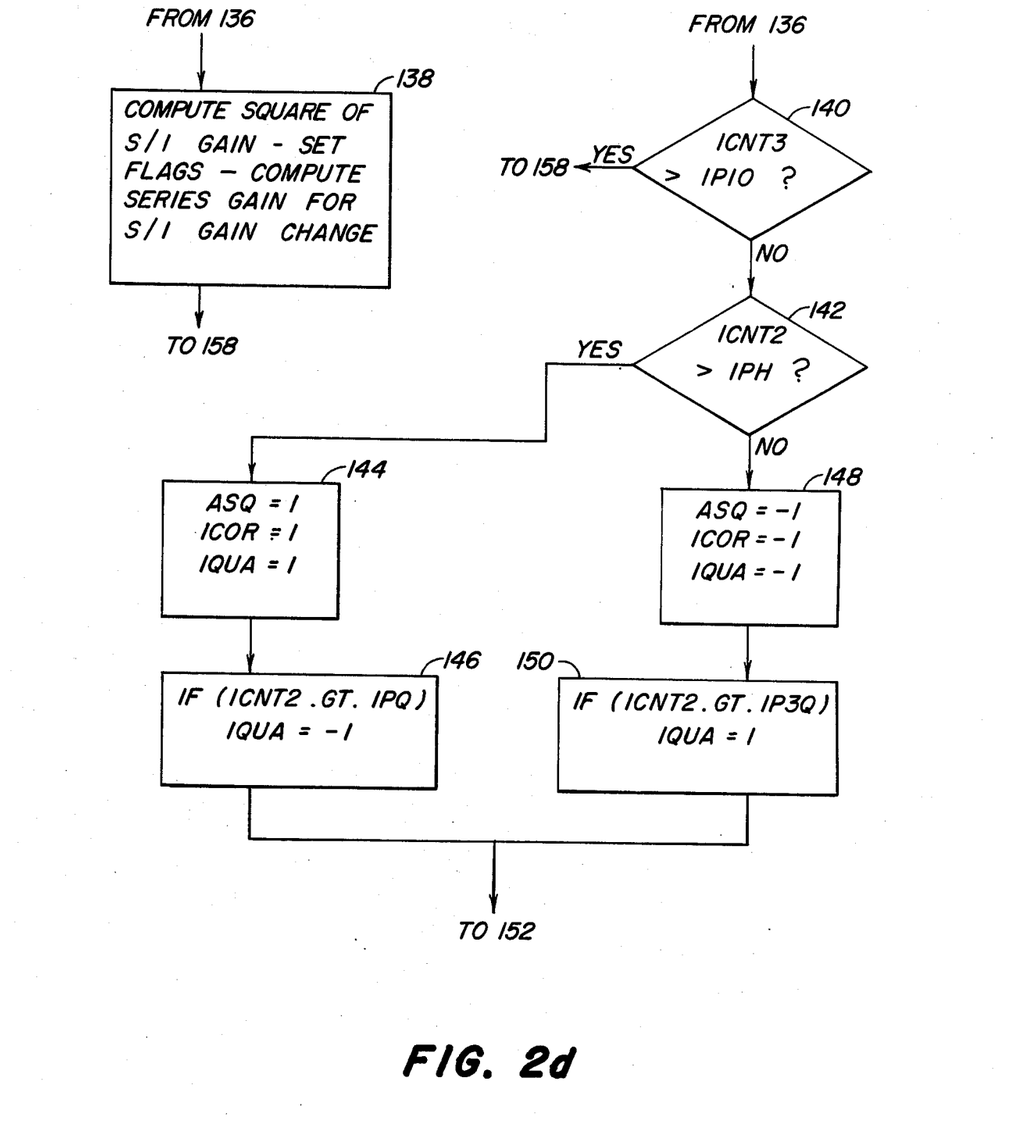
Figure 2E:
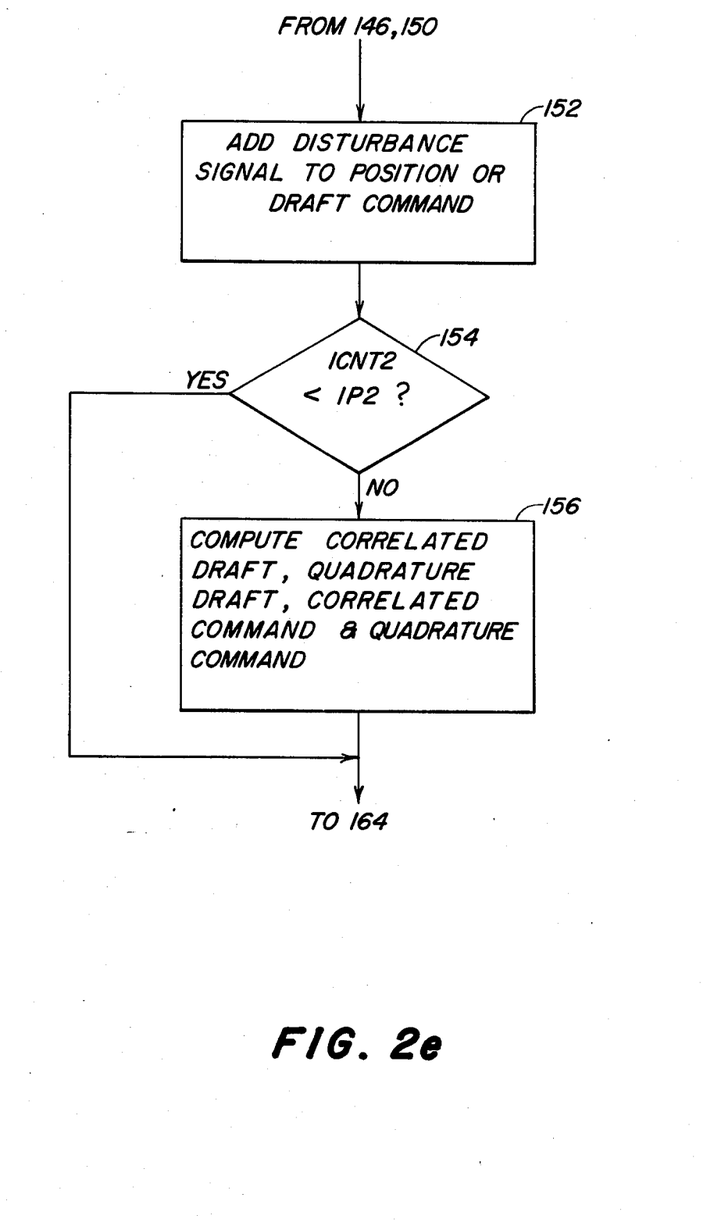

The algorithm begins at step 100 (1-19), whereupon various commons are defined and array areas are established. Then, in the portion of the algorithm represented by block 102 (20-76, 77-212), various states are initialized and parameters are read and set. Then, at 104 (213-376), the variables A1-A9 are sensed and scaled to engineering units. Then, at 106 (396-402), a set of filtered draft force values, FDRFT, FDRF2 and FDRF3 are derived from the sensed draft force using filtering time constants of 0.06 seconds, 0.33 seconds and 0.1 second, respectively. FDRFT is used in the draft force feedback value in the control loop. FDRF2 is used in calculating the draft command set point (line 458). FDRF3 is used in the calculation of the correlated and quadrature values in later step 156. Then, at step 108 (407-410), a positive error value, PERR, is calculated to represent a difference between the sensed rockshaft position and the position of knob 36. Also, an intermediate value, APERR, is calculated.

Steps 110 (411, 412), 111 (411) and 112 (413) operate upon system start-up to prevent hitch movement unless the position control knob 36 is first moved to a "synchronized" position corresponding to the actual sensed rockshaft position and then moved away from the "synchronized" position. Hitch movement is prevented in step 111 (411) by setting the hitch command value, HVCO, equal to zero and then directing the algorithm to step 164. Otherwise, the algorithm proceeds to step 112 (413) where the INIT flag value is set equal to 1 to indicate initial "synchronization" of the rockshaft 22 and position control known 36.

Block or step 114 (415-416) tests whether the switch 30 is in the "raise" position. If not, the algorithm is directed to step 118 (434-436). If yes, the algorithm proceeds to step 116 (417-433) where an HVCO value is calculated to cause the hitch to raise to a 70 degree angle with respect to horizontal and where various variables are set for future gain calculations, after which the algorithm proceeds to step 164.

Step 118 (434-436) determines whether or not the implement 14 has entered the ground by comparing the sensed draft force to some threshold value. If the implement has entered the ground, the algorithm proceeds to step 164. Otherwise, the algorithm proceeds to step 120.

Step 120 (437-480) operates to select or establish the proper draft or position operating mode, depending upon the operator input to position control knob 36. For example, this portion of the algorithm detects whether the operator has moved the position control knob 36 and if so, establishes a position control mode. Otherwise, a draft control mode is established.

If the position control mode is established, then the algorithm proceeds to step 122 (482-484) where the valve command HVCO is derived from a position error value, DERR, after which the algorithm proceeds to step 164.

Figure 3:
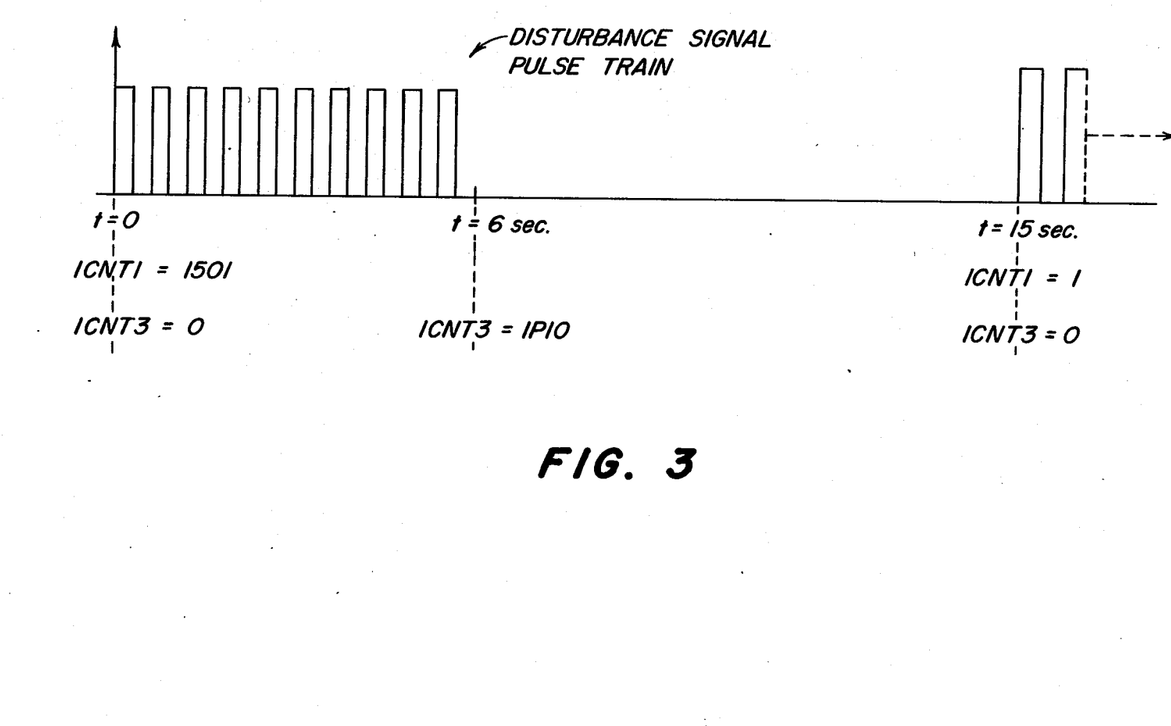
FIG. 3 is a waveform diagram illustrating the behavior over time of a disturbance signal which is used in the present invention.

If the draft control mode is established, then the algorithm proceeds to step 124 (485) which decrements the ICNT1 value, which is a counter value used to determine how often a pulse train (see FIG. 3) of a square wave auxiliary or disturbance signal is superimposed (at step 152) on the normal HVCO signal which is sent to the control valve 26. The disturbance signal has an amplitude, G1, which is preferably equal to 10% of the maximum amplitude of the HVCO signal which can be applied to the control valve 26. In this case, it is preferred that the disturbance signal be applied for a period of 6 seconds, starting at the beginning of a 15 second timing cycle. It should be noted that a square wave disturbance signal is preferred because such a signal is simply represented in the software domain, as are the square wave "Walsh" functions which are described later. However, periodic functions with non-square wave waveforms could be used, if desired.

After step 124, the algorithm proceeds to step 126 (486) which determines if it is the proper time to apply the disturbance signal by examining an "IFLAG" flag value. If the IFLAG value is set equal to 1, as in statement line 519, then the algorithm is directed to step 158 and normal draft control is continued and the disturbance signal is not applied. If IFLAG=0 (as set in statement lines 466 and 529), then it means that the 15 second timing cycle has started over and it is time to begin applying the disturbance signal and the algorithm is directed to steps 128-132.

Steps 128-132 (487-488) increment and control an ICNT2 counter value which is used to control the frequency (preferably 1.67 Hz) of the pulse train which comprises the disturbance signal.

Step 134 (489) increments an ICNT3 counter value which is used to control the duration of the disturbance signal pulse train (preferably 6 seconds or 10 cycles of a 0.6 second period square wave). Then, step 136 (490) determines if the duration of the disturbance signal has expired (by comparing ICNT3 to a value representing 6 seconds). If the duration is complete, the algorithm is directed to step 138 (512-519) which sets appropriate flags and calculates a GNSQ value which is the square of a measured soil/implement gain value which is proportional to the ratio of a change in draft force to the corresponding change in rockshaft angle using the correlated and quadrative draft and command values determined in later step 156. Also, in step 138, a series or adaptive gain value, GAIN3, is calculated for use in compensating for the change in the measured soil/implement gain using the GNSQ value and an experimentally determined gain factor, G2, preferably equal to 0.0005. After step 138, the algorithm proceeds to step 158. If, in step 136, the duration of the disturbance signal has not expired, then the algorithm is directed to step 140 (491), which merely provides a redundant path to step 158.

Next, in step 142 (482), the ICNT2 counter value is compared to an IPH value which represents $\frac{1}{2}$ of a period of the disturbance signal. Thus, step 142, together with steps 144, (498-500), 146 (501), 148 (493-495) and 150 (496), alternates the values of a set of variables representing the sign of the disturbance signal and representing a pair of Walsh functions, Wa and Wb, the Wa Walsh function being in phase with the disturbance signal. These Walsh functions are utilized in a calculation of a set of draft force amplitude coefficients at the disturbance frequency. From steps 146 and 150, the algorithm is directed to step 152.

In step 152 (502-504), the disturbance signal (with magnitude G1 and sign ASQ) is added to the calculated position command value ZPOS to obtain the value command signal, HVCO. One equation, (502), is used if the control system is operating under position control. Another equation (503 and 504) is used if the control system is operating under draft control. In this manner, the effect of the disturbance signal is greater when the control system is operating under draft control.

Step 154 (505) causes the algorithm to proceed directly to step 164 and skip the calculations of step 156 (506-509) until after the third cycle of the disturbance signal to allow for a "steady-state" condition to become established. In step 156, the correlated and quadrature draft and command variables, DCOR, DQUA, FCOR and FQUA are calculated and integrated for 8 complete cycles of the disturbance signal. DCOR represents the component of the total valve command, HVC1, which is in phase (correlated) with the Walsh function, Wa. DQUA represents the component of the total valve command, HVC1, which is in phase (quadrature) with the Walsh function, Wb. FCOR represents the component of the measured draft force which is in phase (correlated) with Walsh function Wa. FQUA represents the component of the sensed draft force which is in phase with (quadrature) Walsh function Wb. It is these values which are used back in previously described step 138 (in particular, in lines (515) and (516), thereof) to calculate the GNSQ and GAIN3 values. Following steps 154 or 156, the algorithm proceeds to step 164.

Figure 2F:
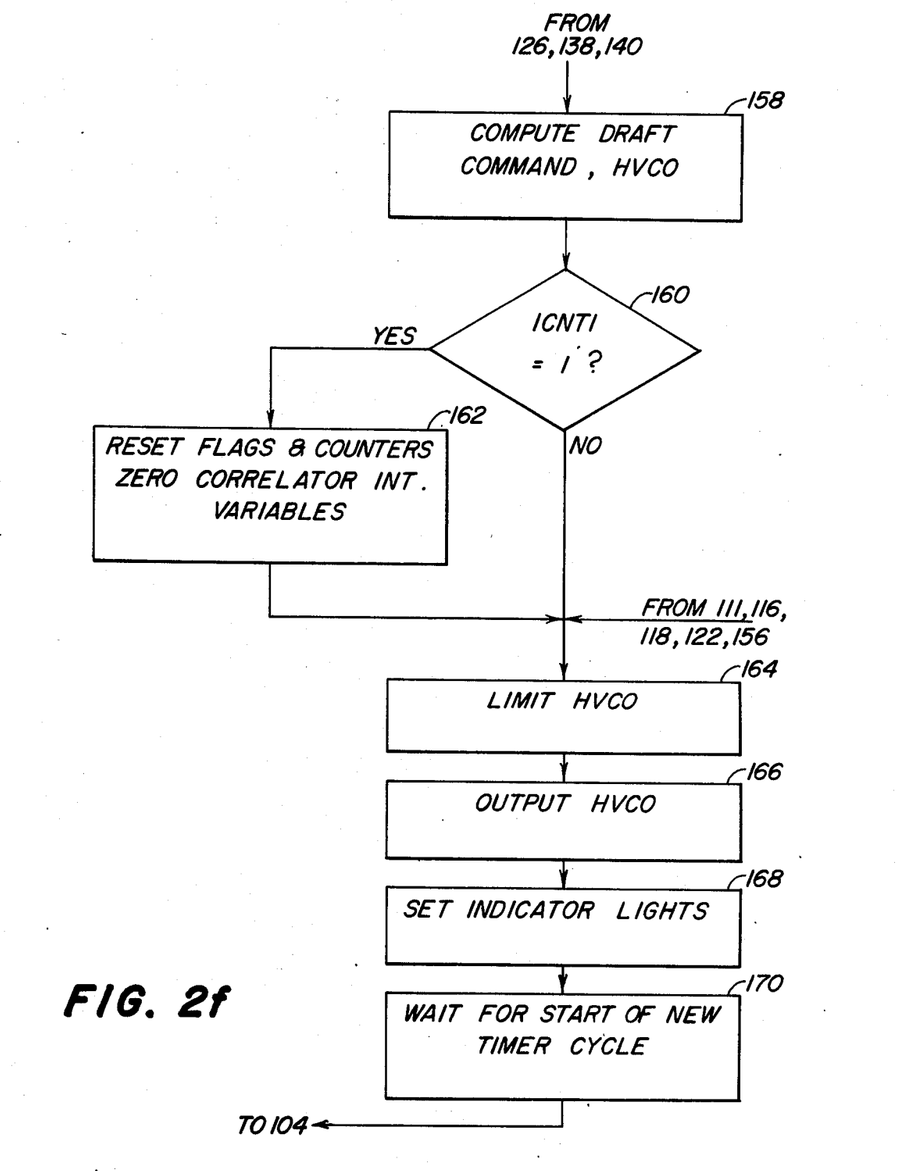

Turning to FIG. 2f, line (521), the algorithm proceeds to step 158 during normal draft operation with no disturbance signal applied. In step 158 (521–523), the valve command value, HVCO, is calculated. This HVCO value includes a draft force feedback term (FDRFT-FD0) multiplied by GAIN3 and a position feedback term (ZPOS-A1).

Next, step 160 detects when the proper time has arrived (ICNT1=1) to direct the algorithm to step 162 where various flags and counters are reset and where the correlated and quadrature draft and command variables FCOR, FQUA, DCOR and DQUA are zeroed. At this point, the algorithm is directed to step 164 (534–535) which limits the magnitude of the HVCO value.

Step 166 (546) then causes this HVCO value to be sent to the control valve 26, and step 168 (547) sets a light (not shown) which may be used for program diagnostics.

Finally, step 170 (554–563) causes the algorithm to wait for the start of a new timing cycle before returning to step 104.

Thus, in summary, this algorithm achieves the goal of calculating a soil/implement gain (represented by GNSQ) which represents the ratio of the change in draft force produced by a corresponding change in rockshaft position. The algorithm also makes the electronic gain (GAIN3) of the control system proportional to the inverse of this calculated soil/implement gain to make the overall control system uniformly responsive despite changes in soil characteristics. This is done by periodically superimposing upon the valve control signal, HVCO, a 10-cycle square-wave disturbance signal. The frequency of the disturbance signal is chosen such that the control system can react to it, but such that there is no strong naturally occurring variation at the same frequency (such as soil and terrain variations).

The control valve 26 and the actuator 24 respond to this disturbance signal (with some delay due to the inertia of the system) by producing hitch and implement movement and corresponding draft force variations. The resulting total valve command signal (see lines 502–504) includes a disturbance signal term, a position error term and a draft force error term, all of which should have some components which vary at the frequency of the disturbance signal. Therefore, to determine the overall soil/implement gain, the algorithm determines the draft force components in phase with and in quadrature phase with (FCOR and FQUA) the disturbance signal. The algorithm also determines the components (DCOR and DQUA) of the valve command having the same phase relationship with the disturbance signal. The total soil/implement gain is related to the ratio of the sum of the squares of these draft and valve command values as follows:

$$GNSQ = (FCOR^2 + FQUA^2)/(DCOR^2 + DQUA^2)$$

The adaptive (electronically varied) gain (GAIN3) is then defined as:

$$GAIN3 = G2/(GNSQ)^{\frac{1}{2}}$$

where G2 is an experimentally determined gain factor of 0.005. This GAIN3 value is then used to determine the valve command signals, HVCO, so that the overall system gain or responsivity has the desired stability.

TABLE OF VARIABLES

Input Variables

A(1) = Rockshaft position
A(2)–(A6) = Force on hitch used with A1 to calculate draft
A(7) = Switch for raise and lower at headland
A(7) = Rockshaft position command

Internal Variables

ADRAFT = Draft
DCOM = Internal rockshaft position command
FDRFT = Filtered draft
FDRF2 = Filtered draft used to calculate draft command FD0
FDRF3 = Filtered draft used in correlator
FD0 = Calculated draft command
PERR = Weighted position error
HVCO = Servo valve command
APERR = Absolute value of PERR
DCOR = Component of total valve command in phase with Wa
DQUA = Component of total valve command in phase with Wb
FCOR = Component of measured draft in phase with Wa
FQUA = Component of measured draft in phase with Wb
GAIN3 = Adaptive gain
ZPOS = Calculated value of position command
LERR = Draft error
DERR = Weighted draft error
ASQ = Sign of auxiliary input square wave
FACT = Gain factor
ICOR = ASQ
IQUA = Sign of quadrature square wave
HVCI = Old value (delayed 1 count) of servo valve command
GNSQ = Square of measured inplement/soil gain

Flags and Counters

INIT = Flag used as safety interlock; INIT=0, Valve command=0.0; INIT=1, (Normal operation)
GCHK = Flag indicating gain is set
ICNT1 = Counter—# of counts between gain measurements
ICNT2 = Counter—# of counts into period of auxiliary waveform
ICNT3 = Counter—# of counts into measurement cycle
IP = # of counts in 1 cycle of auxiliary waveform.

IGT2=Counter used in sensing movement of command knob
ISTP2=Counter used in sensing draft and position command
LITE=Flag indicating position control mode (Lite=0) or draft mode (Lite=2000)
IPH=Counts in ½ cycle of auxiliary waveform
IPQ=Counts in ¼ cycle of auxiliary waveform
IP3Q=Counts in ¾ cycle of auxiliary waveform
IFLAG=Flag indicating gain is set, normal draft operation (IFLAG=1) or gain measurement in progress IFLAG=0.
IP2=Counts in 2 cycles of auxiliary waveform Constants TP1=Draft filter constant
TP2=Draft filter constant
TP3=Draft filter constant DLV=Draft force level used to determine implement entry
G1=Amplitude of auxiliary square wave
G2=Gain factor used to calculate adaptive gain In view of the above-described flow chart, and in view of the Fortran language computer program listing which appears at the end of this description, it will be evident to those skilled in the art to implement the algorithm described in a digital data processor, such as a microprocessor.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

```
C   1 BEFORE THE CONTROL ROUTINE IS ACTIVATED,  ALL SYSTEM PARAMETERS
C  19 ARE INITIALIZED FROM DISK FILES OR FROM ROM.
C  20 THE CONTROL ROUTINE IS CALLED WHEN AN INTERRUPT IS
C  76 GENERATED BY AN EXTERNAL TIMER.  THE INTERRUPT OCCURS
C  77 AT REGULAR INTERVALS ( .01 SECONDS FOR THIS PROGRAM)
C 212 WHEN AN INTERRUPT OCCURS, DATA FROM A/D CONVERTERS IS
C 217 CONVERTED INTO ENGINERERING UNITS AND THE CONTROL
C 276 ROUTINE IS ACTIVATED
C PROCESSING BEGINS HERE
 396 ADRAFT=DRAFT
     WVEL=(A(18)+A(19))*RR
     DCOM=75.0-A(9)
 398 FDRFT=TP1*FDRFT+(1.0-TP1)*ADRAFT
 400 FDRF2=TP3*FDRF2+(1.0-TP3)*ADRAFT
 402 FDRF3=FDRF3*TP2+(1.0-TP2)*ADRAFT
C
C 407       CALCULATE DRAFT SETPOINT
 408 PERR=(DCOM-A(1))*25.0
 409 HVCO=PERR
 410 APERR=ABS(DCOM-A(1))
 411 IF ((INIT .EQ.0).AND.(APERR.GT.2.0)) HVCO=0.0
 412 IF ((INIT.EQ.0).AND.(APERR.GT.2.0)) GO TO 534
 413 INIT=1
C 414      A7 IS THE SWITCH TO LIFT(>50)OR LOWER(<10) THE HITCH
 415 IF(A(7).GT.50.) GO TO 417
 416 GO TO 434
 417 HVCO=25.0*(70.0-A(1))
 418 GCHK=0.
 419 IFLAG=0
     ICNT1=1501
     ICNT2=0
     ICNT3=0
     ISTP2=0
     IGT2=0
     DCOR=0.
     FCOR=0.
     DQUA=0.
     FQUA=0.
     GAIN3=0.
     IDL2=200
 432 LITE=0
 433 GO TO 534
 434 CONTINUE
```

```
C              STAY IN POSITION MODE IF DRAFT< 5.0 KN
  436 IF (DRAFT.LT. DLV) GO TO 534
C 437      THE FOLLOWING STATEMENTS SELECT THE DRAFT SETPOINT
C    FIRST, COMPARE THE DEPTH COMMAND TO THE STORED VALUE OF THE DEPTH COMMAND
C           AND BRANCH IF THE DEPTH KNOB IS NOT CHANGING
  440 IF(ABS(DRCOM-DCOM).LT.1)  GO TO 447
C           WAIT 3 COUNTS TO MAKE SURE DIFFERENCE IS NOT DUE TO NOISE SPIKE
      IF(IGT2.EQ.0)  GO TO 473
      IGT2=IGT2-1
      IF(ISTP2.EQ.0)GO TO 534
      GO TO 480
C           THE NEXT STATEMENT RESETS THE NOISE DELAY
  447 IGT2=3
C           WAIT 100 COUNTS( 1 SECOND) TO SELECT DRAFT SETPOINT
C             AFTER KNOB STOPS CHANGING- OPERATOR IS HAPPY WITH DEPTH
      IF(IDL2.EQ.0) GO TO 456
C           DECREMENT DELAY COUNTER
      IDL2=IDL2-1
      GO TO 480
C           IF ISTP2 EQUALS 1, SETPOINT HAS ALREADY BEEN SELECTED, SO BRANCH TO
C             DRAFT ERROR CALCULATION
  456 IF (ISTP2.EQ.1) GO TO 485
C           SET DRAFT COMMAND TO AVERAGE DRAFT
  458 FDO=FDRF2
C           SET FLAG TO INDICATE THAT SETPOINT HAS BEEN SELECTED
      ISTP2=1
C           INITIALIZE MODEL
      ZPOS=A(1)
      ICNT1=1501
      ICNT2=0
      ICNT3=0
  466 IFLAG=0
      FCOR=0.
      FQUA=0.
      DCOR=0.
      GO TO 485
C           DRAFT COMMAND IS BEING CHANGED BY OPERATOR
C           RESET DELAY COUNTER
  473 IDL2=200
C           INITIALIZE SLOW DRAFT FILTER
      FDRF2=ADRAFT
C           RESET SETPOINT FLAGS
      ISTP2=0
C           UPDATE STORED VALUE OF DEPTH COMMAND
      DRCOM=DCOM
  480 CONTINUE
C           STILL IN POSITION MODE
      DERR=25.0*(DCOM-A(1))
      HVCO=DERR
      GO TO 534
  485 ICNT1=ICNT1-1
  486 IF(IFLAG.EQ.1)GO TO 521
  487 ICNT2=ICNT2+1
  488 IF(ICNT2.GT.IP)ICNT2=1
  489 ICNT3=ICNT3+1
  490 IF(ICNT3.EQ.IP10)GO TO 512
  491 (ICNT3.GT.IP10)GO TO 521
  492 IF(ICNT2-IPH)493,493,498
```

```
493  ASQ=-1.
494  ICOR=-1
495  IQUA=-1
496  IF(ICNT2.GT.IPQ)IQUA=1
497  GO TO 502
498  ASQ=1.
499  ICOR=1
500  IQUA=1
501  IF(ICNT2.GT.IP3Q)IQUA=(-1)
502  HVCO=ASQ*G1+25.0*FACT*(ZPOS-A(1))
503  IF(GAIN3.GT.0.)HVCO=2.0*ASQ*G1+25.0*FACT*((ZPOS-A(1))+
504 $GAIN3*(FDRFT-FDO))
505  IF((ICNT3.LT.IP2))GOTO 510
506  FCOR=FCOR+(FDRF3-FDO)*FLOAT(ICOR)
     FQUA=FQUA+(FDRF3-FDO)*FLOAT(IQUA)
     DCOR=DCOR+HVC1*FLOAT(ICOR)
509  DQUA=DQUA+HVC1*FLOAT(IQUA)
510  CONTINUE
     GO TO 534
512  GCHK=1.0
     LITE=2000
514  IF(ABS(DCOR).LT.0.01)DCOR=0.01
515  GNSQ=(FCOR*FCOR+FQUA*FQUA)/(DCOR*DCOR+DQUA*DQUA)
516  GAIN3=G2/SQRT(GNSQ)
     GDUM=0.01/SQRT(GNSQ)
     ASQ=0.
519  IFLAG=1
C          CALCULATE DRAFT ERROR BASED ON DRAFT SETPOINT, INCLUDE SLIP ERROR
521  LERR=(FDO-FDRFT)*(-1.0)
522  DERR=(GAIN3*LERR+ZPOS-A(1))*25.0*FACT
523  HVCO=DERR
524  IF(ICNT1.EQ.1)GO TO 526
525  GO TO 534
526  ICNT1=1501
     ICNT2=0
     ICNT3=0
529  IFLAG=0
     FCOR=0.
     FQUA=0.
     DCOR=0.
533  DQUA=0.
534  CONTINUE
535  IF (HVCO.GT. 4000) HVCO=4000
536  IF (HVCO.LT. -4000) HVCO=-4000
     HVC1=HVCO
20   HVCO=OFSET-HVCO
25   IF(HVCO.GT.2000.) HVCO=2000.
     IF(HVCO.LT.-2000.) HVCO=(-2000.)
546  ODAT(2)=HVCO
547  ODAT(3)=LITE
C
C 554     OUTPUT BEGINS HERE
C THE OUTPUT ROUTINE CONVERTS THE VALVE CONTROL, HVCO, GENERATED BY THE
C CONTROL ROUTINE INTO A COMMAND TO THE D/A CONVERTER.  THE
C ANALOG VOLTAGE FROM THE D/A CONVERTER IS THEN AMPLIFIED BY
C 563 EXTERNAL ELECTRONICS AND APPLIED TO THE SERVO VALVE.
C
```

What is claimed is:

1. In a vehicle having connecting means for attaching a ground-penetrating implement thereto and actuating means for raising and lowering the implement in response to control signals applied to an input thereof, a control system comprising:

a sensor for sensing at least one operating parameter of the implement and connecting means;

generating means for generating a control signal derived from said at least one sensed operating parameter of the implement and connecting means;

means for superimposing upon the control signal a periodic, time-varying auxiliary signal;

means for automatically determining a response characteristic of the sensed parameter to the auxiliary signal, the determining means comprising first means for determining a first sensed parameter component in phase with the auxiliary signal, second means for determining a second sensed parameter component having a quadrature phase relationship to the auxiliary signal, the first and second sensed parameter and components being dependent upon both the amplitude and phase of the sensed parameter, third means for determining a first control signal component in phase with the auxiliary signal, fourth means for determining a second control signal component having a quadrature phase relationship with the auxiliary signal, the first and second control signal components being dependent upon both the amplitude and phase of the control signal, and fifth means for deriving the response characteristic from a ratio of a sum of squares of the first and second parameter components to a sum of squares of the first and second control components; and means for automatically adjusting a variable gain of the generating means in response to changes in an amplitude of the response characteristic.

2. The control system of claim 1, wherein;

the means for superimposing intermittantly superimposes the auxiliary signal upon the control signal for a limited duration.

3. The control system of claim 2, wherein:

the determining means periodically initiates determination of the response characteristic a predetermined time after initiation of the superimposing of the auxiliary signal.

4. The control system of claim 3, wherein:

the determining means integrates values representing the response characteristic for a predetermined time period.

5. The control system of claim 1, wherein;

the auxiliary signal comprises a squarewave pulse train of certain frequency and duration.

6. The control system of claim 1, wherein the sensor comprises:

draft force sensing means for sensing draft forces produced by implement-ground interaction.

7. The control system of claim 1, wherein:

the adjusting means sets the variable gain proportional to an inverse of a value representing the response characteristic.

8. The control system of claim 1, further comprising:

an operator-controlled device for generating a position signal representing a desired position of the implement;

a position sensor for sensing implement position; and the parameter sensor comprising a draft sensor for sensing draft force produced by implement-ground interaction, the control system having a position control mode wherein the implement is controlled primarily as a function of the operator-controlled device and the sensed implement position and having a draft control mode wherein the implement is controlled primarily as a function of the sensed draft force, the control system including means for preventing implement movement until the position signal generated by the operator-controlled device corresponds to the sensed implement position.

9. The control system of claim 1, further comprising:

an operator-controlled device for generating a position signal representing a desired position of the implement;

a position sensor for sensing implement position; and the parameter sensor comprising a draft sensor for sensing draft force produced by implement-ground interaction, the control system having a position control mode wherein the implement is controlled primarily as a function of the operator-controlled device and the sensed implement position and having a draft control mode wherein the implement is controlled primarily as a function of the sensed draft force, the control system including means for varying auxiliary signal magnitude as a function of which control mode is operating.

10. The control system of claim 9, wherein:

the auxiliary signal magnitude superimposed during draft control mode operation is larger than the auxiliary signal magnitude superimposed during position control mode operation.

11. In a vehicle having connecting means for attaching a ground-penetrating implement thereto and actuating means for raising and lowering the implement in response to control signals applied to an input thereof, a control system comprising:

generating means for generating a control signal derived from at least one sensed operating parameter of the implement and connecting means;

means for superimposing upon the control signal a periodic, time-varying auxiliary signal, the means for superimposing intermittently superimposing the auxiliary signal upon the control signal for a limited duration;

means for automatically determining a response characteristic of the sensed parameter to the auxiliary signal, the response characteristic having a certain frequency relationship to the auxiliary signal, the determining means periodically initiating determination of the response characteristic a predetermined time after initiation of the superimposing of the auxiliary signal; and means for automatically adjusting a variable gain of the generating means in response to changes in the response characteristic.

12. The control system of claim 11, wherein:

the determining means integrates values representing the response characteristic for a predetermined time period.

13. In a vehicle having connecting means for attaching a ground-penetrating implement thereto and actuating means for raising and lowering the implement in response to control signals applied to an input thereof, a control system comprising:
- an operator-controlled device for generating a position signal representing a desired position of the implement;
- a position sensor for sensing implement position;
- a draft sensor for sensing draft force produced by implement-ground interaction;
- generating means for generating a control signal derived from at least one sensed operating parameter of the implement and connecting means;
- means for superimposing upon the control signal a periodic, time-varying auxiliary signal;
- means for automatically determining a response characteristic of the sensed parameter to the auxiliary signal, the response characteristic having a certain frequency relationship to the auxiliary signal; and
- means for automatically adjusting a variable gain of the generating means in response to changes in the response characteristic, the control system having a position control mode wherein the implement is controlled primarily as a function of the operator-controlled device and the sensed implement position and having a draft control mode wherein the implement is controlled primarily as a function of the sensed draft force, the control system including means for varying auxiliary signal magnitude as a function of which control mode is operating.

14. The control system of claim 13, wherein:
the auxiliary signal magnitude superimposed during draft control mode operation is larger than the auxiliary signal magnitude superimposed during position control mode operation.

15. In a vehicle having connecting means for attaching a ground-penetrating implement thereto and actuating means for raising and lowering the implement in response to control signals applied to an input thereof, a control system comprising:
- an operator-controlled device for generating a position signal representing a desired position of the implement;
- a position sensor for sensing implement position;
- a draft sensor for sensing draft force produced by implement-ground interaction; and
- generating means for generating a control signal derived from at least one sensed operating parameter of the implement and connecting means, the control system having a position control mode wherein the implement is controlled primarily as a function of the operator-controlled device and the sensed implement position and having a draft control mode wherein the implement is controlled primarily as a function of the sensed draft force, the control system including means operable upon start up of the control system for preventing any implement movement until the operator controlled device is adjusted by the operator to generate a position signal which corresponds to the sensed implement position.

* * * * *